United States Patent
Tamhane et al.

(10) Patent No.: US 9,661,523 B1
(45) Date of Patent: May 23, 2017

(54) METHOD AND APPARATUS FOR DYNAMICALLY ADAPTING A TRANSMISSION RATE OF A WIRELESS COMMUNICATION DEVICE IN A WIRELESS NETWORK

(71) Applicant: Marvell International Ltd., Hamilton (BM)

(72) Inventors: Sagar A. Tamhane, Santa Clara, CA (US); Sarang Shrikrishna Wagholikar, Sunnyvale, CA (US); Liwen Chu, San Ramon, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 163 days.

(21) Appl. No.: 14/660,147

(22) Filed: Mar. 17, 2015

Related U.S. Application Data

(60) Provisional application No. 61/954,469, filed on Mar. 17, 2014.

(51) Int. Cl.
*H04W 28/02* (2009.01)
*H04W 56/00* (2009.01)
(Continued)

(52) U.S. Cl.
CPC ....... *H04W 28/0226* (2013.01); *H04L 1/0002* (2013.01); *H04W 56/006* (2013.01); *H04W 56/0065* (2013.01); *H04W 84/12* (2013.01)

(58) Field of Classification Search
CPC .... H04B 17/104; H04J 3/0635; H04J 3/0638; H04J 3/0655; H04J 3/0661; H04J 3/0667;
(Continued)

(56) References Cited

U.S. PATENT DOCUMENTS

| | | | |
|---|---|---|---|
| 2004/0240565 A1* | 12/2004 | Santhoff | G01S 13/765 375/259 |
| 2007/0162185 A1* | 7/2007 | McFarland | G01S 5/0289 700/258 |

(Continued)

OTHER PUBLICATIONS

Wi-Fi Alliance. Marketing Requirements Document for Interoperability Testing of Wi-Fi Location Capabilities Version 0.01 (Jan. 2013): 27 pages.

(Continued)

*Primary Examiner* — Benjamin H Elliott, IV

(57) ABSTRACT

A first wireless communication device including a distance determination module. The distance determination module is configured to calculate a distance between the first wireless communication device and a second wireless communication device. The first wireless communication device is configured to communicate with the second wireless communication device at one of a plurality of available data rates. A rate selection module is configured to select, based on the distance between the first wireless communication device and the second wireless communication device, a first data rate from the plurality of available data rates and/or adjust, based on the distance, the first data rate. The adjusted first data rate corresponds to a second data rate selected from the plurality of available data rates. A transceiver is configured to communicate with the second wireless communication device at the first data rate and/or the second data rate.

16 Claims, 5 Drawing Sheets

(51) Int. Cl.
  *H04L 1/00* (2006.01)
  *H04W 84/12* (2009.01)
(58) Field of Classification Search
  CPC ...... H04J 3/067; H04L 1/1678; H04L 9/3297;
    H04L 1/0002; H04L 43/0894; H04L
    43/10; H04L 43/106; H04L 47/25; H04L
    47/263; H04L 47/28; H04W 28/22;
    H04W 52/26; H04W 88/181; H04W
    56/0075
  See application file for complete search history.

(56) References Cited

U.S. PATENT DOCUMENTS

| | | | |
|---|---|---|---|
| 2008/0139141 A1 | 6/2008 | Varghese et al. | |
| 2011/0274141 A1* | 11/2011 | Jantunen | H04B 1/7183 375/138 |
| 2014/0297220 A1* | 10/2014 | Raffa | B60N 2/002 702/150 |

OTHER PUBLICATIONS

IEEE Std. 802.11a-1999; Supplement to IEEE Standard for Information Technology—Telecommunications and information exchange between systems—Local and metropolitan area networks—Specific requirements; Part: 11 Wireless LAN Medium Access Control (MAC) and Physical Layer (PHY) specifications; High-speed Physical Layer in the 5 GHz Band; pp. 1-91.

IEEE Std. 802.11b; Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; Sep. 16, 1999; 96 Pages.

IEEE 802.11n—Mujtaba, Syed Aon "TGn Sync Proposal Technical Specification" IEEE P802.11-04/0889r6; May 18, 2005; 131 Pages.

IEEE P802.11ac / D2.1; Draft STANDARD for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz; Prepared by the 802.11 Working Group of the 802 Committee; Mar. 2012; 363 pages.

IEEE P802.11ax/D0.1 Draft Standard for Information Technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for high efficiency in frequency bands between 1 GHz and 6 GHz; Mar. 2016; 221 Pages.

IEEE Std. 802.11-2012; IEEE Standard for Information technology—Telecommunications and information exchange between systems Local and metropolitan area networks—Specific requirements; Part 11: Wireless LAN Medium Access Control (MAC) and Physical Layer (PHY) Specifications; IEEE Computer Society; Sponsored by the LAN/MAN Standards Committee; Mar. 29, 2012; 2793 pages.

802.16-2009 IEEE Standard for Local and Metropolitan area networks; Part 16: Air Interface for Broadband Wireless Access Systems; IEEE Computer Society and the IEEE Microwave Theory and Techniques Society; Sponsored by the LAN/MAN Standard Committee; May 29, 2009; 2082 pages.

IEEE Std. 802.20-2008; IEEE Standard for Local and metropolitan area networks; Part 20: Air Interface for Mobile Broadband Wireless Access Systems Supporting Vehicular Mobility—Physical and Media Access Control Layer Specification; IEEE Computer Society; Sponsored by the LAN/MAN Standards Committee; Aug. 29, 2008; 1032 pages.

IEEE P802.11ad / D5.0 (Draft Amendment based on IEEE P802.11REVmb D10.0) (Amendment to IEEE 802.11REVmb D10.0 as amended by IEEE 802.11ae D5.0 and IEEE 802.11aa 06.0); Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications —Amendment 3: Enhancements for Very High Throughput in the 60 GHz Band; Sponsor IEEE 802.11 Committee of the IEEE Computer Society; Sep. 2011; 601 pages.

IEEE 802.11ah; IEEE 802.11-11/0035r0; Heejung Yu, Il-gy Lee, Minho Cheng, Hun Sik Kang, Sok-kuy Lee; Dated Jan. 12, 2011; 10 Pages.

* cited by examiner

METHOD AND APPARATUS FOR DYNAMICALLY ADAPTING A TRANSMISSION RATE OF A WIRELESS COMMUNICATION DEVICE IN A WIRELESS NETWORK

CROSS-REFERENCE TO RELATED APPLICATIONS

This application claims the benefit of U.S. Provisional Application No. 61/954,469, filed on Mar. 17, 2014. The entire disclosure of the application referenced above is incorporated herein by reference.

FIELD

The present disclosure relates to systems and methods for rate selection and adaptation in wireless communication devices, and in particular to using a distance between wireless communication devices to perform rate selection and adaptation.

BACKGROUND

The Institute of Electrical and Electronics Engineers (IEEE) has developed several 802.11X specifications (e.g., 802.11a, 802.11b, 802.11n, 802.11ac, 802.11ax, and the like) that define communication protocols used by network devices operating in wireless local area networks (WLANs). For example, the communication protocols include authentication schemes that can be used to securely exchange data between the network devices. The communication protocols include power-saving strategies that can be used to save power in the network devices. The communication protocols include synchronization schemes to synchronize clocks of the network devices, and so on. Some protocols include wireless location services (WLS) such as a fine timing measurement (FTM) procedure used to measure time of flight (ToF) between two devices. The ToF is used to measure a range (i.e., distance) between the devices.

FIG. 1 shows an example FTM procedure used to measure ToF between two client stations STA1 and STA2 operating in a WLAN. STA2 initiates an FTM request by sending a request frame (FTM request) to STA1. STA1 receives the FTM request at time t0 and responds by sending a corresponding acknowledgment frame (ACK). The FTM request and the corresponding acknowledgement frame are followed by STA1 sending an FTM response frame (FTM_1) to STA2. The FTM response frame leaves a transmit antenna of STA1 at time t1 and arrives at a receive antenna of STA2 at time t2. STA1 and STA2 may measure timestamps indicative of when the FTM response frame leaves the transmit antenna from STA1 ($t1$) and when the FTM response frame arrives at the receive antenna at STA2 ($t2$). STA2 responds by sending an acknowledgement frame to STA1. The ACK frame leaves a transmit antenna of STA2 at time t3 and arrives at a receive antenna of STA1 at time t4. STA2 and STA1 measure timestamps indicative of when the ACK frame leaves the transmit antenna of STA2 ($t3$) and when the ACK frame arrives at the receive antenna of STA1 ($t4$). As described above merely for example purposes, in various modes (e.g., in an "as soon as possible," or ASAP, mode), a station may indicate a capability of capturing the timestamp associated with the initial FTM frame (e.g., t1 for FTM_1). In some modes, however, one or more of the stations may not be configured to capture the timestamp t1.

The FTM request transmitted by STA2 includes a burst offset field (i.e., a field that indicates a value of a burst offset). The burst offset corresponds to a duration (e.g., 10 ms) between reception of the FTM request by STA1 and a start of a burst period. Accordingly, the burst offset provides an indication, to the stations STA1 and STA2, of the start of the burst period. The stations perform the FTM based on frames transmitted during the burst period. The burst period corresponds to a duration between a start of one burst period (e.g., burst period 1) to a start of a next burst period (e.g., burst period 2).

For example, STA2 transmits another FTM request to STA1 at the start of the burst period 1. STA1 transmits an ACK and then provides t1 and t4 to STA2 in an FTM response (FTM_2). STA2 calculates a round trip time (RTT), which is twice the ToF between STA1 and STA2, as RTT=(t4−t1)−(t3−t2)=(t2−t1)+(t4−t3). The ToF between STA1 and STA2 is RTT/2. A distance between STA2 and STA can then be determined based on the ToF. STA2 can perform additional calculations based on transmitted frames and respective times in burst period 2.

SUMMARY

A first wireless communication device including a distance determination module. The distance determination module is configured to calculate a distance between the first wireless communication device and a second wireless communication device. The first wireless communication device is configured to communicate with the second wireless communication device at one of a plurality of available data rates. A rate selection module is configured to select, based on the distance between the first wireless communication device and the second wireless communication device, a first data rate from the plurality of available data rates and/or adjust, based on the distance between the first wireless communication device and the second wireless communication device, the first data rate. The adjusted first data rate corresponds to a second data rate selected from the plurality of available data rates. A transceiver is configured to communicate with the second wireless communication device at the first data rate and/or the second data rate.

A method of operating a first wireless communication device includes calculating a distance between the first wireless communication device and a second wireless communication device. The first wireless communication device is configured to communicate with the second wireless communication device at one of a plurality of available data rates. The method further includes selecting, based on the distance between the first wireless communication device and the second wireless communication device, a first data rate from the plurality of available data rates and/or selectively adjusting, based on the distance between the first wireless communication device and the second wireless communication device, the first data rate. The adjusted first data rate corresponds to a second data rate selected from the plurality of available data rates. The method further includes communicating with the second wireless communication device at the first data rate and/or the second data rate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
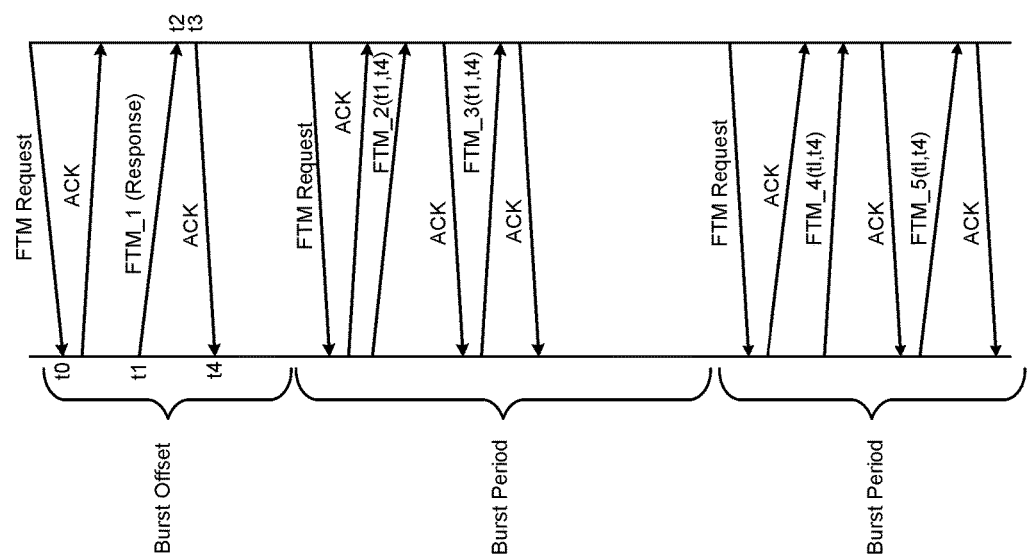
FIG. 1 illustrates an example a fine timing measurement (FTM) procedure.

Wireless communication devices operating in a wireless local area network (WLAN) may be configured to perform rate selection and adaption. Devices may implement a rate selection algorithm to select a data rate for communication between a first wireless communication device (e.g., STA1) and a second wireless communication device (e.g., STA2). The devices may also implement a rate adaption algorithm to subsequently adjust the select data rate in response to various performance factors. For example, STA1 may select a data rate (e.g., R1) that is supported by both STA1 and STA2. R1 may correspond to a maximum data rate supported by both STA1 and STA2. The devices may determine the maximum data rate supported by both devices by exchanging beacon or other management frames that identify the maximum supported data rate of the respective devices.

Each of the devices may evaluate performance at the selected rate R1 and determine whether another rate is more suitable. For example, a device may consider factors such as a packet error rate (PER) to determine whether another rate is more suitable. For example only, if the PER is greater than a first threshold, the devices may adjust the selected rate to another rate (R2) less than R1 to reduce the PER. Conversely, if the PER is less than a second threshold (e.g., a second threshold less than the first threshold), the devices may adjust the selected rate to another rate (R3) that is greater than R2 to determine whether the PER is still acceptable (e.g., below the first threshold) while communicating at the greater rate R3. The devices may consider other factors (e.g., throughput) to ultimately select the most suitable data rate (e.g., a rate that maximizes desirable metrics such as throughput while minimizing undesirable metrics such as the PER).

The devices may periodically (e.g., at 100 ms intervals) and/or conditionally adjust the data rate to determine whether to select a different data rate. For example, the devices may periodically adjust the data rate to each of a higher rate and a lower data rate and/or to all available data rates. For example only, the devices may randomly select data rates to evaluate at each periodic interval until all available data rates are evaluated. Conditionally adjusting the data rate may include, for example, adjusting the data rate to a lower rate in response to the PER reaching the first threshold and/or adjusting the data rate to a higher rate in response to operating at a current rate for a predetermined period with the PER below the second threshold.

Rate selection and adaptation systems and methods according to the principles of the present disclosure select and adjust data rates for communication between devices further based on a determined distance between the devices. For example, in embodiments, a fine timing measurement (FTM) procedure may be used to determine a time of flight (ToF) between the devices. The distance between the devices is calculated based on the ToF. The calculated distance can then be used to select and/or adjust the data rate between the devices. For example, the devices can calculate attenuation based on the distance and select and/or adjust the data rate based on the attenuation.

Figure 2:
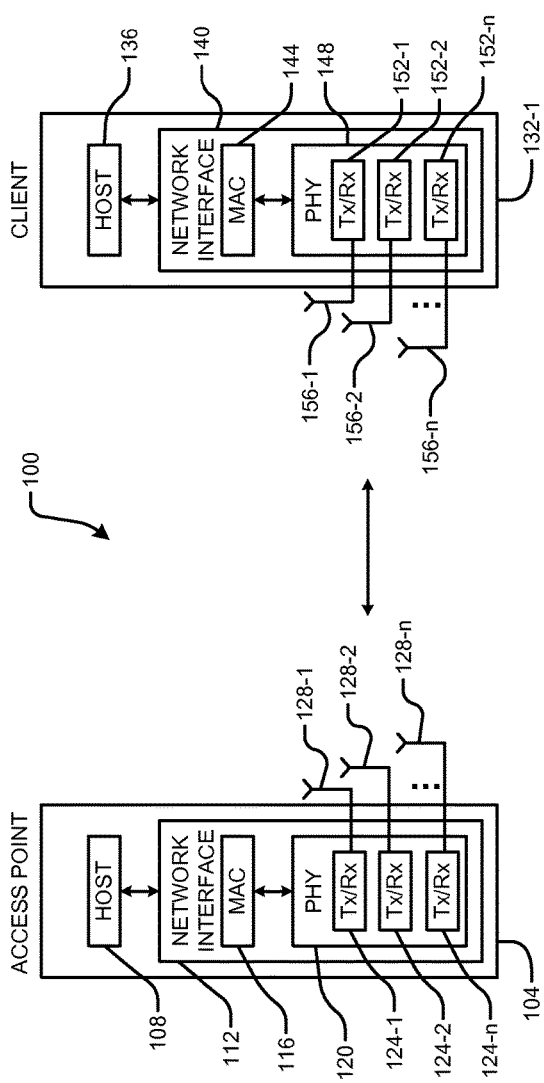
FIG. 2 is an example wireless local area network including one or more wireless communication devices.

FIG. 2 shows an example WLAN 100 including one or more wireless communication devices configured to implement systems and methods according to an embodiment of the present disclosure. The WLAN 100 includes an access point (AP) 104 having a host processor 108 in communication with a network interface 112. The network interface 112 includes a medium access control (MAC) device 116 and a physical layer (PHY) device 120. The PHY device 120 includes a plurality of transceivers 124-1, 124-2, . . . , and 124-n, referred to collectively as transceivers 124. The transceivers 124 communicate with respective antennas 128-1, 128-2, . . . , and 128-n, referred to collectively as antennas 128.

The AP 104 communicates with one or more client stations 132. The client station 132 includes a host processor 136 in communication with a network interface 140. The network interface 140 includes a MAC device 144 and a PHY device 148. The PHY device 148 includes a plurality of transceivers 152-1, 152-2, . . . , and 152-n, referred to collectively as transceivers 152. The transceivers 152 communicate with respective antennas 156-1, 156-2, . . . , and 156-n, referred to collectively as antennas 128. Although the WLAN 100 is described with respect to communication between an AP and a client station, the principles of the present disclosure also correspond to communication between APs, communication between client stations, etc.

The host processor 108, the MAC device 116, and/or the PHY device 120 of the AP 104 may be configured to transmit and receive FTM request, response, and acknowledgment frames to perform an FTM procedure and calculate a distance between the AP 104 and the client station 132 accordingly. The client station 132 may be configured to calculate the distance between the client station 132 and the AP 104 in a similar manner. Each of the AP 104 and the client station 132 are further configured to select and adjust a data rate for communication based on the distance according to one implementation of the present disclosure.

Figure 3:
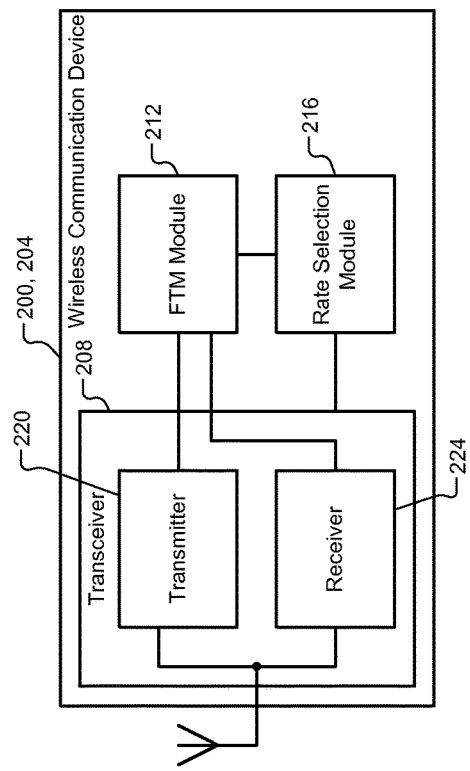
FIG. 3 is an example wireless communication device.

FIG. 3 shows example wireless communication devices (e.g., an AP and a client station, an AP and an AP, a client station and a client station, etc.) 200, 204 in detail. The devices 200, 204 each include a transceiver 208 (e.g., corresponding to one of the transceivers 124 or 152 as shown in FIG. 2), a distance determination module (such as an FTM module 212), and a rate selection module 216. The transceiver 208 includes a transmitter 220 and a receiver 224. While only one antenna is shown, the devices 200, 204 may include multiple antennas (e.g., antennas arranged in a MIMO configuration) as shown in FIG. 2. The functions and operations of each of these modules of the devices 200, 204 are described below in detail with further reference to FIGS. 4-6. For example only, the FTM module 212 and the rate selection module 216 may be implemented in one or more various components of the devices 200, 204, including, but not limited to, a PHY, MAC, or SME sublayer, a baseband processor, etc.

The FTM module 212 implements an FTM procedure to measure ToF between the devices 200, 204. The FTM module 212 performs various functions related to FTM negotiation between the devices 200, 204, including, but not limited to, generation of FTM request, response, and acknowledgement frames for transmission and processing of received FTM request, response, and acknowledgement frames. The FTM module 212 calculates ToF between the devices 200, 204 based on results of the FTM procedure and provides the ToF to the rate selection module 216. The rate selection module 216 may be configured to calculate a distance between the devices 200, 204 based on the ToF. In embodiments, the FTM module 212 may calculate the distance based on the ToF and provide the distance to the rate selection module 216.

The rate selection module 216 is configured to use the distance (whether received from the FTM module 212 or calculated by the rate selection module 216 using the ToF received from the FTM module 212) to select and adjust the data rate for communication between the devices 200, 204. The rate selection module 216 may select/adjust the data rate based on the distance, calculate an attenuation experienced between the devices 200, 204 based on the distance and select/adjust the data rate based on the attenuation, etc. For example, attenuation may be directly proportional to distance and can be calculated using the distance according to known methods. As distance between the devices 200, 204 increases, attenuation increases and throughput decreases. Various 802.11 integrated circuit (IC) chips (e.g., as implemented by the devices 200, 204) may store and/or operate according to information including Rate vs Range (RvR) profiles. RvR profiles associate attenuation with throughput, PER, etc. for various data transmission rates. Accordingly, the rate selection module 216 may select data rates based on target throughput, PER, etc. for a known attenuation (e.g., as calculated based on the distance between the devices 200, 204).

In embodiments, the rate selection module 216 selects an initial data rate (i.e., a data rate selected when the devices 200, 204 initially begin to communicate, hereinafter an "initial rate selection") based on the calculated distance between the devices 200, 204. For example, the rate selection module 216 may select the initial data rate using a maximum rate supported by both of the devices 200, 204. A minimum attenuation corresponding to the calculated distance (e.g., as indicated by a stored RvR profile) may also be considered in making the selection. The RvR profile may correlate the attenuation with a "best" rate R2 (e.g., a rate that, for the determined attenuation, maximizes throughput while maintaining PER less than a threshold). If R2 is greater than a default initial rate R1, then the rate selection module 216 selects R1 as the initial rate. Conversely, if R2 is less than R1, then the rate selection module 216 selects R2 as the initial rate. In this manner, the rate selection module 216 is configured to select a lower initial rate when the distance (and, therefore, the attenuation) is known. Accordingly, the rate selection module 216 may more quickly converge on a more suitable rate (i.e., a rate that considers communication inefficiencies caused by the distance between the devices 200, 204).

Figure 4:
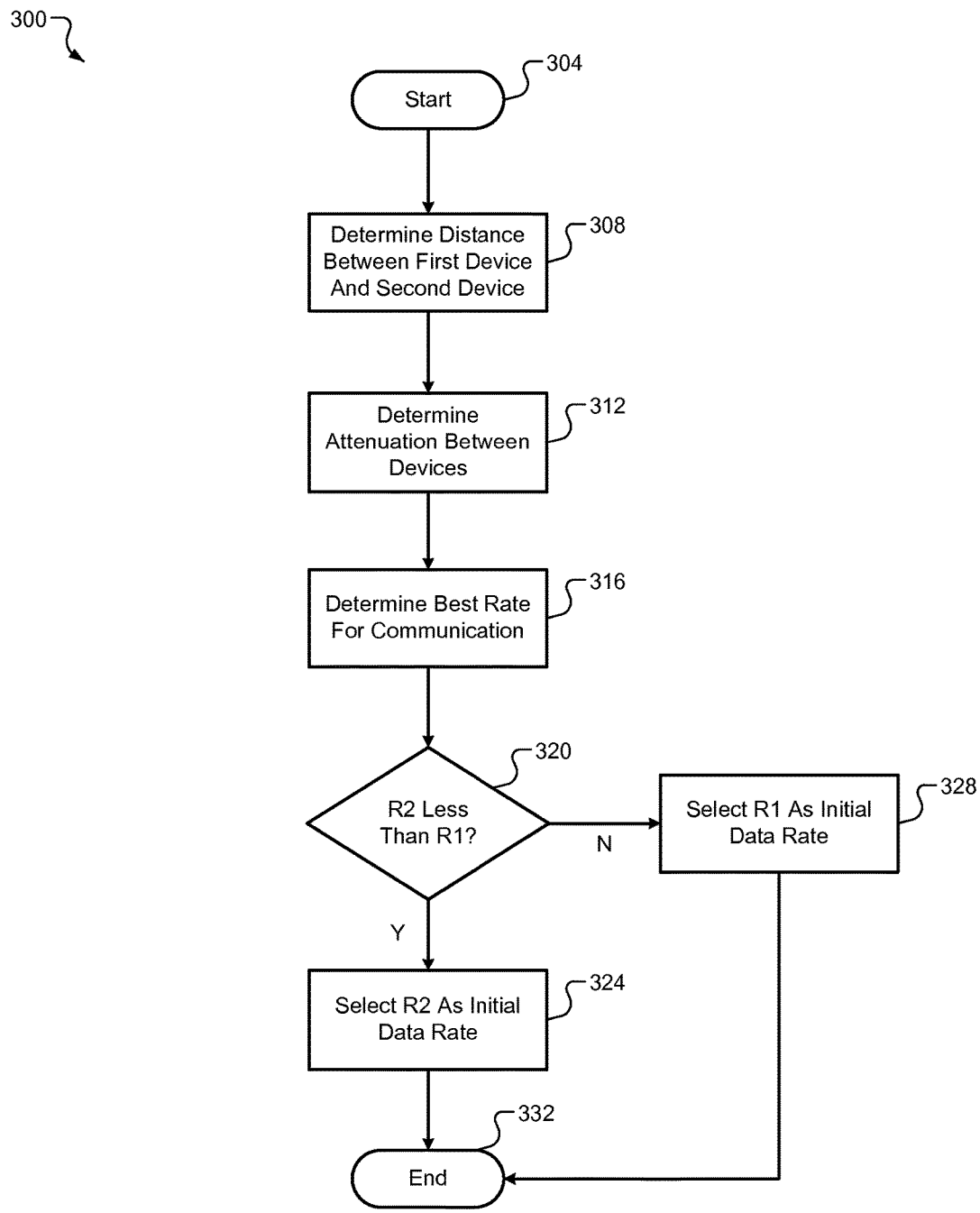
FIG. 4 is an example method for performing an initial rate selection.

FIG. 4 shows an example method 300 for performing an initial rate selection according to one implementation of the present disclosure. The method 300 begins at 304. At 308, the method 300 determines a distance between a first device and a second device. For example, the rate selection module 216 receives a ToF between two devices and calculates the distance based on the ToF, and/or receives the distance from another component. At 312, the method 300 determines an attenuation between the devices based on the distance. For example, the rate selection module 216 calculates the attenuation based on the distance. At 316, the method 300 determines a best rate (e.g., a rate having a maximum throughput) for communication between the devices based on the attenuation. For example, the rate selection module 216 determines a best rate R2 based on an RvR profile that correlates the attenuation to a throughput. At 320, the method 300 determines whether R2 is less than R1. If true, the method 300 continues to 324. If false, the method 300 continues to 328. At 324, the method 300 selects R2 as the initial data rate for communication between the devices and then ends at 332. At 328, the method 300 selects R1 as the initial data rate for communication between the devices and ends at 332.

In embodiments, the rate selection module 216 continues to monitor the distance between the devices 200, 204 (e.g., periodically via the FTM procedure performed by the FTM module 212) and adjusts the selected data rate accordingly. For example, the rate selection module 216 may compare a current distance D2 between the devices 200, 204 to a previous distance D1 between the devices 200, 204, and adjust the selected data rate (e.g., as described above in FIG. 4) if the distances D1 and D2 are different (or, in embodiments, if a difference between D1 and D2 is greater than a threshold). The rate selection module 216 may perform this rate adjustment periodically in addition to performing the rate adjustment in response to the distance changing.

Accordingly, the rate selection module 216 may determine whether the devices 200, 204 are moving further apart or closer together, and may preemptively adjust the rate prior to the corresponding attenuation between the devices 200, 204 necessitating a data rate change. For example, if two or more successive distance calculations indicate that the devices 200, 204 are moving further apart, the rate selection module 216 may select a rate R3 that is less than the currently selected rate (R1 or R2) regardless of whether a current distance actually necessitates a change to a lower rate. In other words, if the devices 200, 204 are moving further apart, the rate selection module 216 may select R3 even if the RvR profile for the current distance calculation corresponds to R1, R2, etc. Conversely, the rate selection module 216 may select a rate R3 that is greater than the currently selected rate if D2 is less than D1, indicating that the devices 200, 204 are moving closer together.

Figure 5:
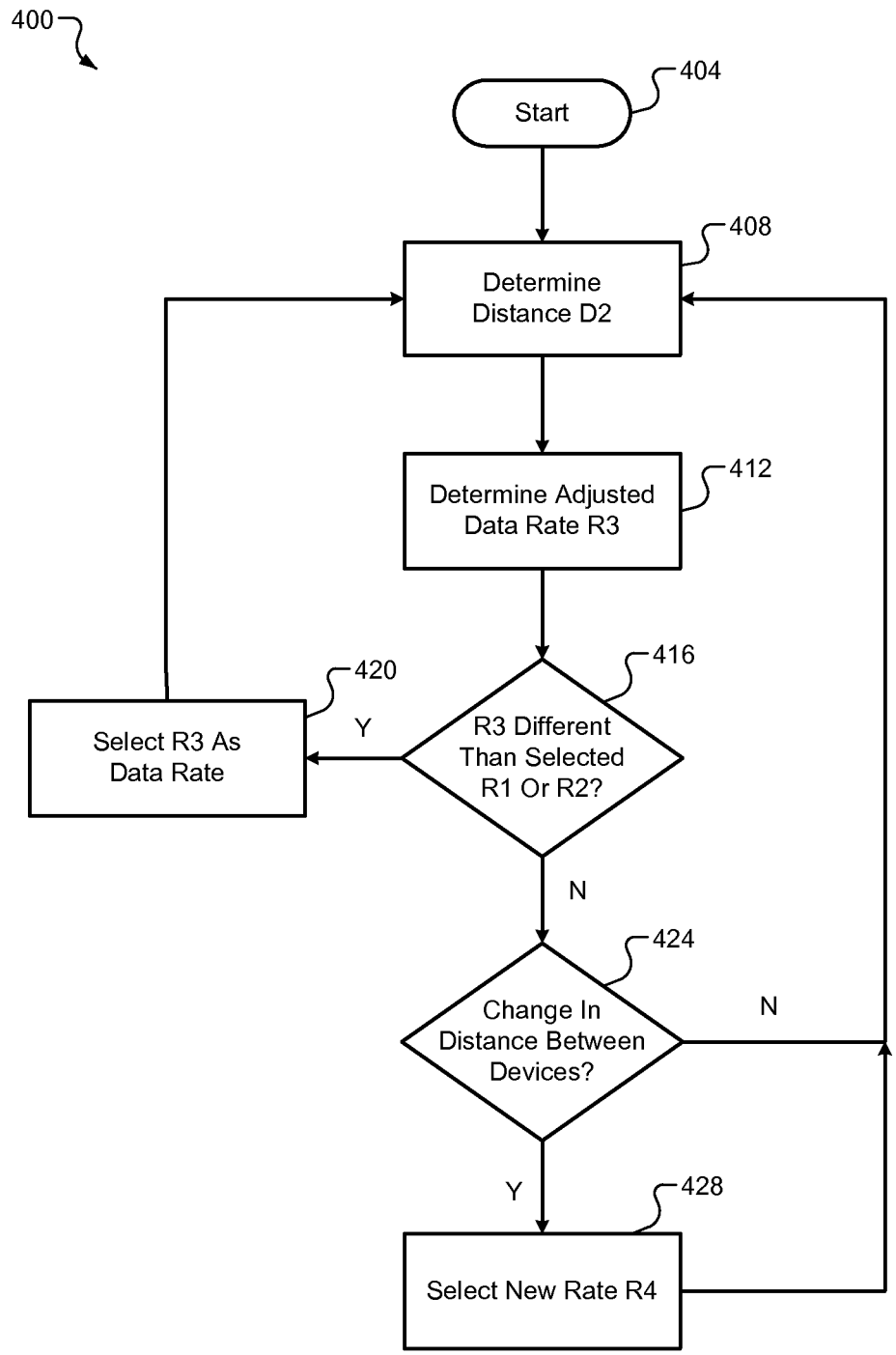
FIG. 5 is an example method for performing a rate adjustment.

FIG. 5 shows an example method 400 for performing a rate adjustment according to one implementation of the present disclosure. The method 400 begins at 404. At 408, the method 400 determines a distance D2 between a first device and a second device. For example, the rate selection module 216 receives a ToF between two devices and calculates the distance D2 based on the ToF, and/or receives the distance D2 from another component. At 412, the method 400 determines an adjusted data rate R3 for communication between the devices based on the distance D2. For example, the rate selection module 216 determines the data rate as described in FIG. 4.

At 416, the method 400 determines whether R3 is different from a currently selected data rate R1 or R2. If true, the method 400 continues to 420. If false, the method 400 continues to 424. At 420, the method 400 selects R3 as the data rate for communication between the devices. For example, the rate selection module 216 selects R3 and the devices begin to communicate at R3, and the method 400 continues to 408.

At 424, the method 400 determines whether the devices are moving closing together or further apart based on D2 and distances D1 and D3 (e.g., where D1 is a previous distance calculated prior to D2 and D3 is a previous distance calculated prior to D1). For example, the rate selection module 216 determines, based on successive measurements of D2, D1, and D3, whether the distance between the devices is increasing or decreasing. If true, the method 400 continues to 428. If false, the method 400 continues to 408. At 428, the method 400 selects a new rate R4 (e.g., that is less than the currently selected rate if the distance between the devices is increasing and that is greater than the currently selected rate if the distance between the devices is decreasing) and then continues to 408.

In embodiments, rather than selecting a next lower or next higher rate if the distance between the devices is increasing or decreasing, the rate selection module 216 may be configured to select a rate R4 that is more than one rate lower or more than one rate higher than the currently selected rate to more quickly converge on the most suitable rate.

In embodiments where devices automatically (e.g., periodically) reevaluate and/or adjust the rate (i.e., even without a change in distance, PER, etc.), one or more lower or higher rates may be evaluated. For example, devices may periodically (e.g., at periodic evaluation intervals) change the data rate to all available rates to evaluate each rate and determine whether the data rate may be adjusted. If another rate achieves a higher throughput, then that rate may be selected. The rate selection module 216 according to the principles of the present disclosure is configured to forego evaluating higher rates if a currently selected rate corresponds to a best rate at a known current attenuation (e.g., based on the distance between the devices 200, 204).

For example, if the distance is not known and a currently selected rate corresponds to modulation and coding scheme (MCS) 5, a device may periodically change to other rates (e.g., MCS 4, MCS 6, etc.) to determine throughput at those other rates. However, if distance and attenuation are determined as described above, the rate selection module 216 may determine (e.g., using the RvR profile) that the currently selected rate corresponds to the best rate at the current attenuation, and therefore will not change to and evaluate higher rates (e.g., rates corresponding to MCS7, MCS8, etc.).

Figure 6:
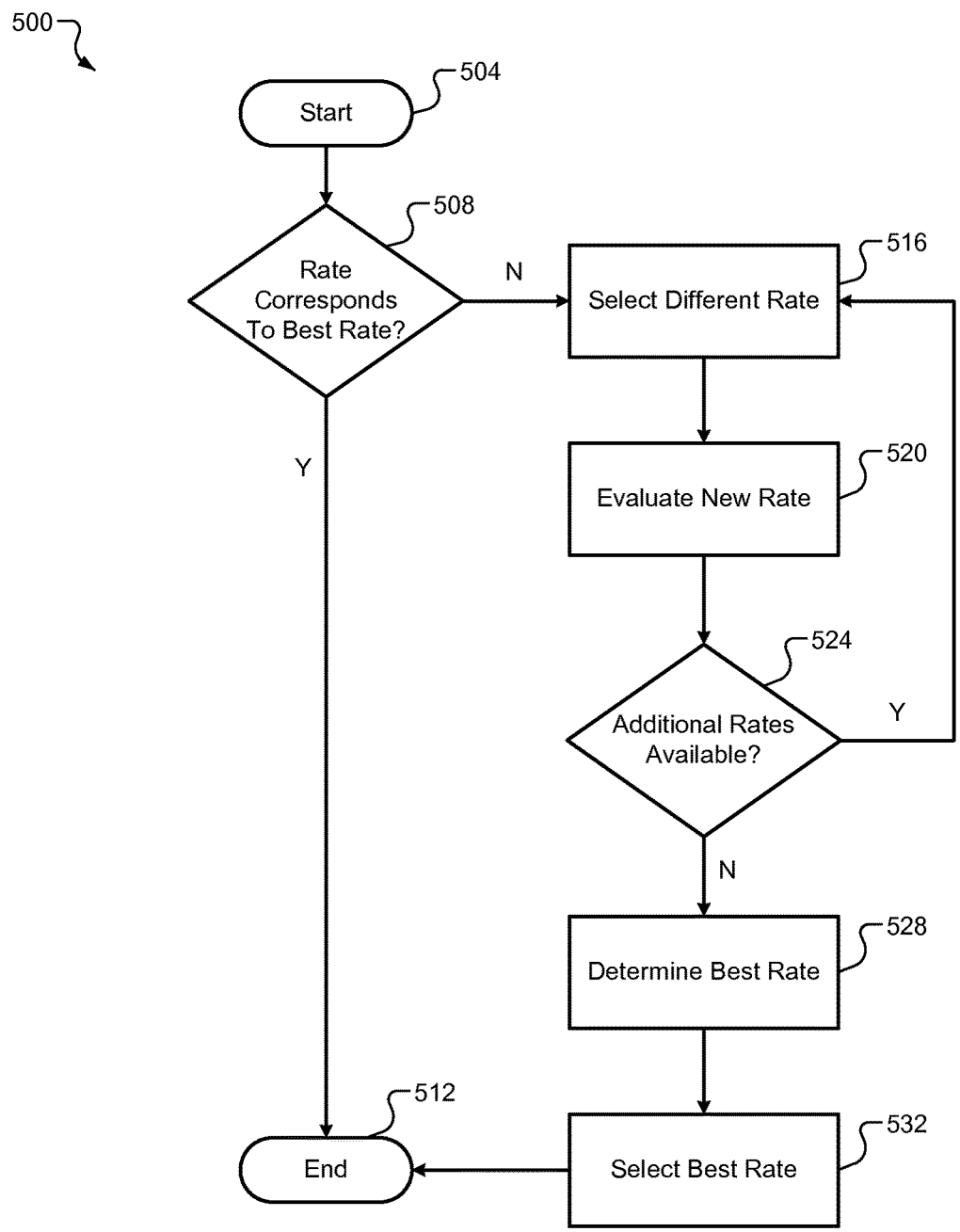
FIG. 6 is an example method for performing a periodic rate evaluation.

FIG. 6 shows an example method 500 for performing a periodic rate evaluation according to one implementation of the present disclosure. The method 500 begins at 504, which corresponds to the beginning of a periodic evaluation interval. At 508, the method 500 determines whether a currently selected rate corresponds to a best rate for the current attenuation between devices. For example, the rate selection module 216 determines a distance and attenuation between the devices, and determines the best rate based on the attenuation (e.g., using the RvR profile). If true, the method 500 (and the corresponding periodic evaluation interval) ends at 512. If false, the method 500 continues to 516.

At 516, the method 500 selects a different rate. For example, the rate selection module 216 selects the different rate and the devices begin communicating at the new rate. At 520, the method 500 evaluates the new rate (e.g., measures throughput, PER, etc. and stores data corresponding to the measurements). At 524, the method 500 determines whether additional rates are available for evaluation. If true, the method 500 continues to 516. If false, the method 500 continues to 528. At 528, the method 500 determines, based on the stored data, which rate corresponds to the best rate (e.g., which rate resulted in a highest throughput). At 532, the method 500 selects the rate corresponding to the best rate and then ends at 512.

The wireless communications described in the present disclosure can be conducted in full or partial compliance with IEEE standard 802.11-2012, IEEE standard 802.16-2009, IEEE standard 802.20-2008, and/or Bluetooth Core Specification v4.0. In various implementations, Bluetooth Core Specification v4.0 may be modified by one or more of Bluetooth Core Specification Addendums 2, 3, or 4. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term 'module' or the term 'controller' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for," or in the case of a method claim using the phrases "operation for" or "step for."

What is claimed is:

1. A first wireless communication device, comprising:
a distance determination module configured to calculate a distance between the first wireless communication device and a second wireless communication device, wherein the first wireless communication device is configured to communicate with the second wireless communication device at one of a plurality of available data rates;
a rate selection module configured to determine, based on the calculated distance between the first wireless communication device and the second wireless communication device, an attenuation between the first wireless communication device and the second wireless communication device, and (i) select, based on the attenuation and stored data associating the attenuation with the plurality of available data rates, a first data rate from the plurality of available data rates and/or (ii) adjust, based on the attenuation and the stored data, the first data rate, wherein the adjusted first data rate corresponds to a second data rate selected from the plurality of available data rates; and
a transceiver configured to communicate with the second wireless communication device at the first data rate and/or the second data rate.

2. The first wireless communication device of claim 1, wherein, to calculate the distance, the distance determination module is configured to (i) calculate a time of flight between the first wireless communication device and the second wireless communication device, wherein the time of flight corresponds to an amount of time for a frame transmitted from the first wireless communication device to be received by the second wireless communication device, and (ii) calculate the distance based on the time of flight.

3. The first wireless communication device of claim 1, wherein, to calculate the distance, the distance determination module is configured to perform a fine timing measurement procedure.

4. The first wireless communication device of claim 1, wherein, to select the first data rate and/or adjust the first data rate, the rate selection module is configured to select the first data rate and/or adjust the first data rate based on a packet error rate and/or a throughput associated with the attenuation and the plurality of available data rates.

5. The first wireless communication device of claim 1, wherein the rate selection module is configured to determine, based on the distance, whether the distance between the first wireless communication device and the second wireless communication device is increasing or decreasing.

6. The first wireless communication device of claim 5, wherein, to adjust the first data rate, the rate selection module is configured to adjust the first data rate based on whether the distance between the first wireless communication device and the second wireless communication device is increasing or decreasing.

7. A first wireless communication device, comprising:
a distance determination module configured to calculate a distance between the first wireless communication device and a second wireless communication device, wherein the first wireless communication device is configured to communicate with the second wireless communication device at one of a plurality of available data rates;
a rate selection module configured to (i) select, based on the distance between the first wireless communication device and the second wireless communication device, a first data rate from the plurality of available data rates and/or (ii) adjust, based on the distance between the first wireless communication device and the second wireless communication device, the first data rate, wherein the adjusted first data rate corresponds to a second data rate selected from the plurality of available data rates; and
a transceiver configured to communicate with the second wireless communication device at the first data rate and/or the second data rate,
wherein the rate selection module is configured to determine, based on the distance, an attenuation between the first wireless communication device and the second wireless communication device, and
wherein, to select the first data rate and/or adjust the first data rate, the rate selection module is configured to use a rate vs range profile associated with the first wireless communication device, wherein the rate vs range profile correlates the plurality of data rates to respective throughputs and/or packet error rates based on the attenuation.

8. A first wireless communication device, comprising:
a distance determination module configured to calculate a distance between the first wireless communication device and a second wireless communication device, wherein the first wireless communication device is configured to communicate with the second wireless communication device at one of a plurality of available data rates;
a rate selection module configured to (i) select, based on the distance between the first wireless communication device and the second wireless communication device, a first data rate from the plurality of available data rates and/or (ii) adjust, based on the distance between the first wireless communication device and the second wireless communication device, the first data rate, wherein the adjusted first data rate corresponds to a second data rate selected from the plurality of available data rates; and
a transceiver configured to communicate with the second wireless communication device at the first data rate and/or the second data rate,
wherein the rate selection module is configured to determine, based on the distance, an attenuation between the first wireless communication device and the second wireless communication device, and
wherein, to adjust the first data rate, the rate selection module is configured to (i) calculate, based on the distance and the attenuation between the first wireless communication device and the second wireless communication device, a maximum rate and (ii) selectively forego evaluating data rates higher than the maximum rate.

9. A method of operating a first wireless communication device, the method comprising:
calculating a distance between the first wireless communication device and a second wireless communication device, wherein the first wireless communication device is configured to communicate with the second wireless communication device at one of a plurality of available data rates;
determining, based on the calculated distance between the first wireless communication device and the second wireless communication device, an attenuation between the first wireless communication device and the second wireless communication device;
selecting, based on the attenuation and stored data associating the attenuation with the plurality of available data rates, a first data rate from the plurality of available data rates, and/or
selectively adjusting, based on the attenuation and the stored data, the first data rate, wherein the adjusted first data rate corresponds to a second data rate selected from the plurality of available data rates; and
communicating with the second wireless communication device at the first data rate and/or the second data rate.

10. The method of claim 9, wherein calculating the distance includes (i) calculating a time of flight between the first wireless communication device and the second wireless communication device, wherein the time of flight corresponds to an amount of time for a frame transmitted from the first wireless communication device to be received by the second wireless communication device, and (ii) calculating the distance based on the time of flight.

11. The method of claim 9, wherein calculating the distance includes performing a fine timing measurement procedure.

12. The method of claim 9, wherein selecting the first data rate and/or adjusting the first data rate includes selecting the first data rate and/or adjusting the first data rate based on a packet error rate and/or a throughput associated with the attenuation and the plurality of available data rates.

13. The method of claim 9, wherein selecting the first data rate and/or adjusting the first data rate includes using a rate vs range profile associated with the first wireless communication device, wherein the rate vs range profile correlates the plurality of data rates to respective throughputs and/or packet error rates based on the attenuation.

14. The method of claim 9, wherein adjusting the first data rate includes (i) calculating, based on the distance and the attenuation between the first wireless communication device and the second wireless communication device, a maximum rate and (ii) selectively foregoing evaluating data rates higher than the maximum rate.

15. The method of claim 9, further comprising determining, based on the distance, whether the distance between the first wireless communication device and the second wireless communication device is increasing or decreasing.

16. The method of claim 15, wherein adjusting the first data rate includes adjusting the first data rate based on whether the distance between the first wireless communication device and the second wireless communication device is increasing or decreasing.

* * * * *